United States Patent
Lange et al.

(10) Patent No.: US 10,027,402 B2
(45) Date of Patent: Jul. 17, 2018

(54) REPEATER SYSTEM FOR USE ON A MOVEABLE OBJECT

(71) Applicant: Andrew Wireless Systems GmbH, Buchdorf (DE)

(72) Inventors: Keld Knut Lange, Oetisheim (DE); Alfons Dussmann, Gansheim (DE); Daniel Schwab, Gersthofen (DE)

(73) Assignee: Andrew Wireless Systems GmbH, Buchdorf (DE)

( * ) Notice: Subject to any disclaimer, the term of this patent is extended or adjusted under 35 U.S.C. 154(b) by 0 days.

(21) Appl. No.: 15/560,126

(22) PCT Filed: Oct. 15, 2015

(86) PCT No.: PCT/IB2015/057941
§ 371 (c)(1),
(2) Date: Sep. 20, 2017

(87) PCT Pub. No.: WO2016/156949
PCT Pub. Date: Oct. 6, 2016

(65) Prior Publication Data
US 2018/0102830 A1    Apr. 12, 2018

(30) Foreign Application Priority Data
Mar. 27, 2015 (EP) .................................. 15161405

(51) Int. Cl.
*H04B 7/14* (2006.01)
*H04B 7/155* (2006.01)
(Continued)

(52) U.S. Cl.
CPC .... *H04B 7/15535* (2013.01); *H04W 36/0011* (2013.01); *H04W 84/005* (2013.01); *H04W 84/047* (2013.01)

(58) Field of Classification Search
CPC .......... H04B 7/15535; H04W 36/0011; H04W 84/005; H04W 84/047455
(Continued)

(56) References Cited

U.S. PATENT DOCUMENTS 6,501,942 B1 * 12/2002 Weissman ............ H04B 7/0817
455/14
8,532,566 B2 * 9/2013 Dussmann ......... H04B 7/15535
455/11.1
(Continued)

FOREIGN PATENT DOCUMENTS

| EP | 2533433 | 3/2014 |
|---|---|---|
| WO | 2013166640 | 11/2013 |
| WO | 2014120054 | 8/2014 |

OTHER PUBLICATIONS

International Searching Authority, "International Search Report and Written Opinion from PCT Application No. PCT/IB2015/057941 dated Dec. 18, 2015", "from PCT Application No. PCT/IB2015/057941", Dec. 18, 2015, pp. 1-13, Published in: WO.

*Primary Examiner* — Sanh Phu
(74) *Attorney, Agent, or Firm* — Fogg Powers LLC

(57) ABSTRACT

A repeater system includes a first master unit and a second master unit located on the movable object, such as a train. The master units are each connected to an antenna for receiving a downlink RF signal from at least one base station outside of the movable object and for transmitting an uplink RF signal towards the base station. Remote units are associated with different coverage areas within the movable object and are connected to the master units unit via a transport medium. The remote units are each connected to an antenna system for transmitting the downlink RF signal into the associated coverage area of the movable object and for receiving the uplink RF signal from the coverage area. A control unit can control first gain for the connection with the
(Continued)

first master unit and a second gain for the connection with the second master unit.

20 Claims, 5 Drawing Sheets

(51) Int. Cl.
*H04W 84/00* (2009.01)
*H04W 84/04* (2009.01)
*H04W 36/00* (2009.01)

(58) Field of Classification Search
USPC .......................................................... 455/16
See application file for complete search history.

(56) References Cited

U.S. PATENT DOCUMENTS

| | | | |
|---:|---:|---|---|
| 9,577,738 B2* | 2/2017 | Nilsson | H01Q 25/005 |
| 2002/0016152 A1* | 2/2002 | Weissman | H04B 7/02 |
| | | | 455/16 |
| 2007/0071128 A1* | 3/2007 | Meir | H03G 3/3042 |
| | | | 375/297 |
| 2010/0248619 A1 | 9/2010 | Senarath et al. | |
| 2013/0188753 A1* | 7/2013 | Tarlazzi | H04B 7/024 |
| | | | 375/299 |

* cited by examiner

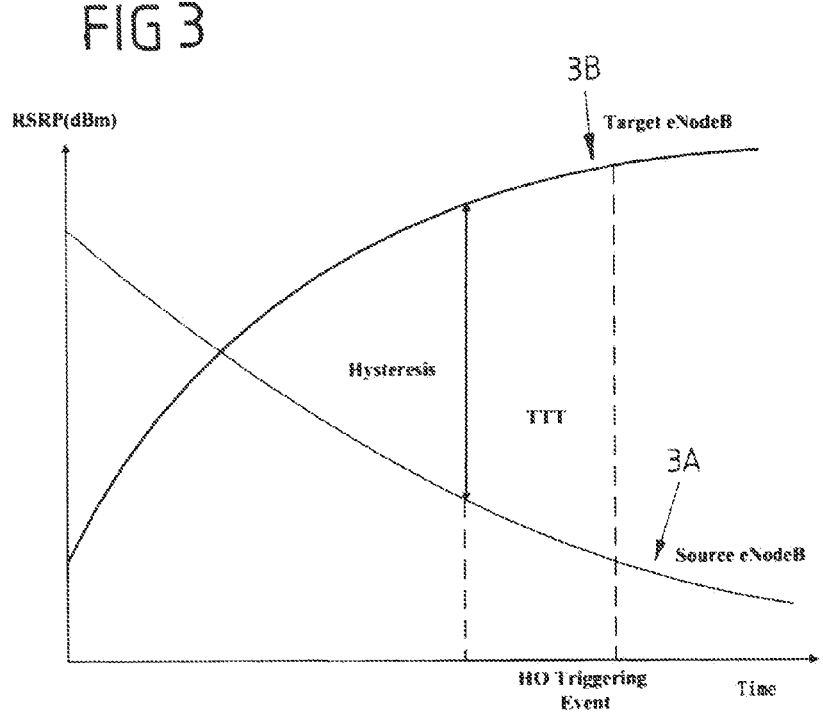
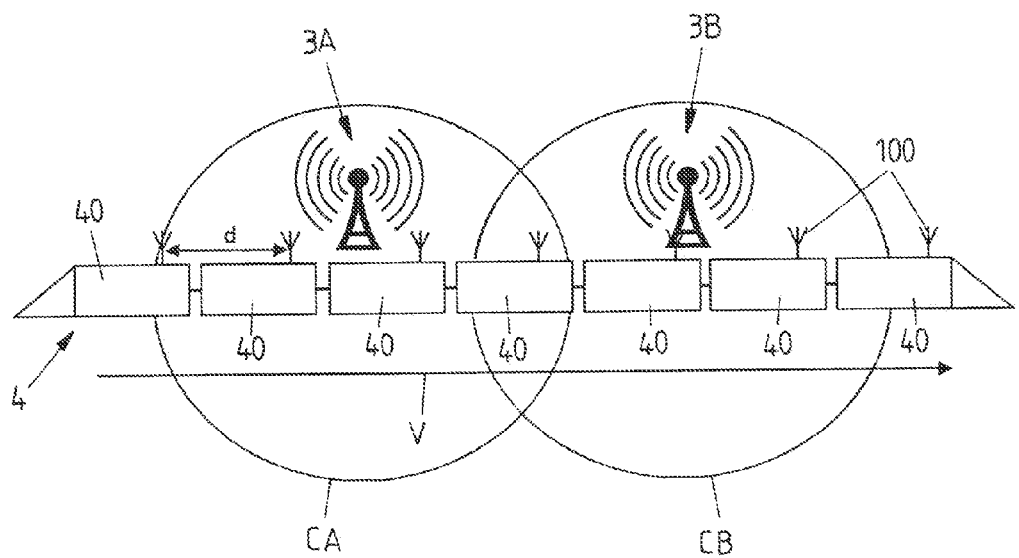

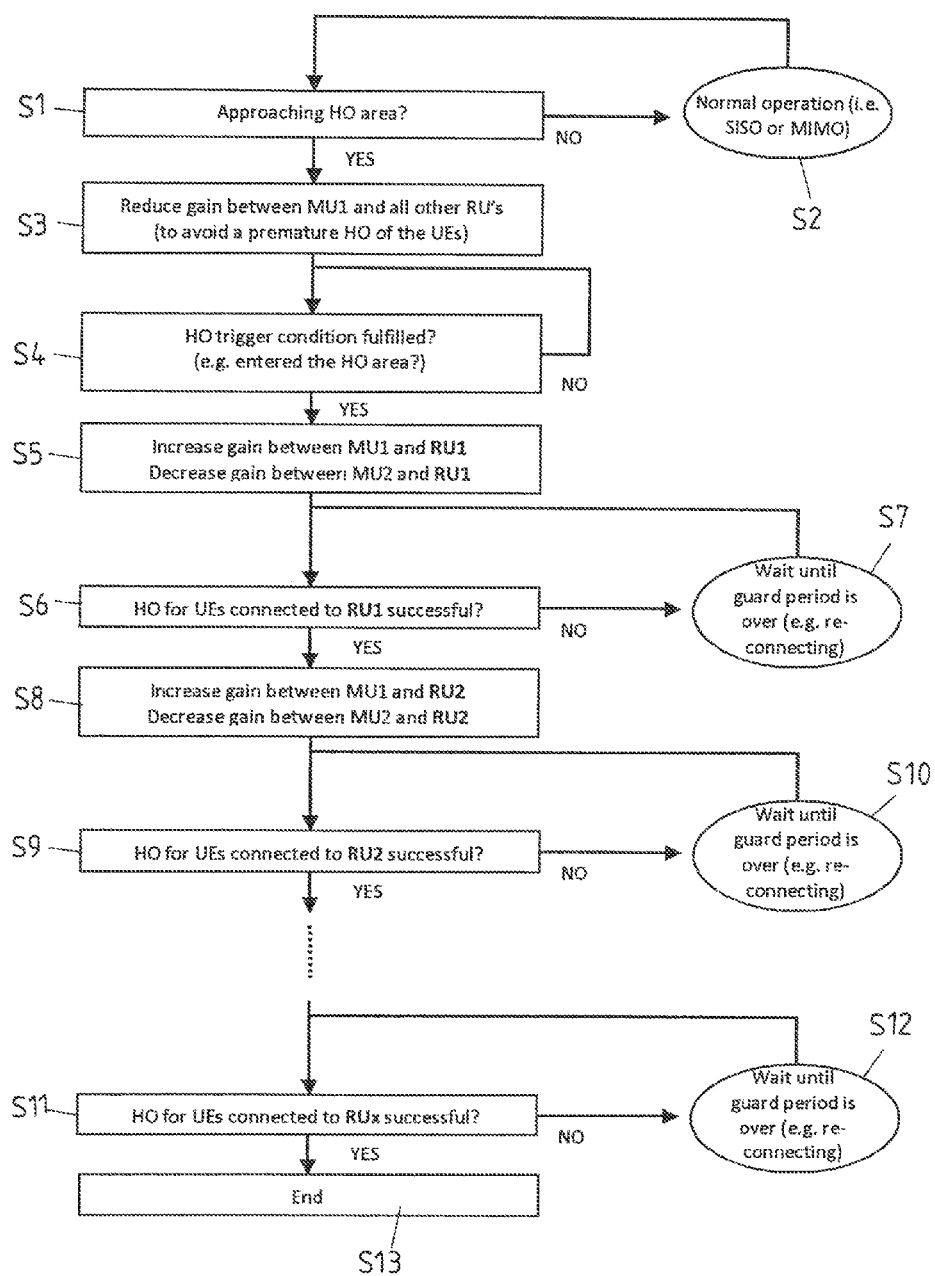

REPEATER SYSTEM FOR USE ON A MOVEABLE OBJECT

CROSS-REFERENCE TO RELATED APPLICATION

This application is a U.S. National Stage application of PCT Application Serial No. PCT/IB2015/057941, filed 15 Oct. 2015 and titled "REPEATER SYSTEM FOR USE ON A MOVABLE OBJECT," which claims priority to European Patent Application number EP15161405.4, titled "Repeater system for use on a movable object" and filed Mar. 27, 2015, the entirety of all of which is incorporated by reference.

TECHNICAL FIELD

The present disclosure relates generally to telecommunications systems. More specifically, but not by way of limitation, this disclosure relates to a repeater system for use on a movable object and to a method for controlling a repeater system.

BACKGROUND

Repeater systems can serve a wide frequency band, for example a complete 3GPP band. A frequency band typically contains multiple carriers carrying information according to different communication technologies and standards such as GSM, UMTS, LTE or the like.

A repeater system of this kind may for example be used on a train to provide network coverage within the train.

High-speed train applications in this regard can present challenging RF environments. The complexities of different terrain combined with rapidly changing outdoor signal levels of the various networks can make it difficult for operators to provide the coverage and service their customers demand while travelling from city to city or to another country. To improve the reliability of wireless signals on trains, repeater systems in the shape of so-called distributed antenna systems (DAS) have proven to be cost-effective. A DAS may for example be installed within a train and serve to amplify a signal to compensate an attenuation caused by the train (due to, for example, metalized windows on high-speed trains reducing signal penetration into the train carriages, which may result in spotty coverage and dropped calls).

A DAS generally may be installed within a train and amplify, during operation, a signal between a pick-up antenna at the outside of the train and an antenna network within the carriages of the train. On the one hand, the DAS compensates the attenuation of the signals caused by the train. On the other hand, however, the signals of all users are combined and communicated via a single (or a few) common pick-up antenna mounted on the outside of the train. In case the train enters a communication cell of another base station, this can inherently cause a simultaneous handover (HO) of multiple users located inside the train and communicating via the repeater system. Thus, a large number of handovers of the multiple users located within the train may occur in a very short timeslot, which may, depending on the train speed and the overlapping area of the base stations taking part in the handover, increase the so-called handover outage probability.

One solution to alleviate this problem is to use several independent repeater systems with several pick-up antennas. For example, each carriage may be equipped with an individual repeater system. Thereby, the handover scenario of the users located on the train is split by carriage and hence into several portions as the carriages enter a handover region with overlapping cells of adjacent base stations one after the other in a time-offset manner.

For example, if a distance of 50 m is assumed between the pick-up antennas of repeater systems of adjacent carriages, the handover of users of adjacent carriages can be triggered with a time offset of 0.51 seconds, assuming the train is travelling at 350 km/h. This time difference generally may be sufficient when considering that an expected average handover time is less than 300 ms (as specified for example for a 3GPP network).

This multi-antenna concept can perform well, but has the drawback that each carriage is equipped with a separate pick-up antenna (respectively a separate DAS), which generally is costly. In addition, the delay between the handovers of the individual carriages is determined by the distance of pick-up antennas of successive carriages and the train speed. Thus, in case the handover of users in one carriage fails, there possibly is an increased interference during the handover procedures of the next carriage in that the mobile devices (UE) may try to re-connect to the (former) base station. This may increase the probability of handover outage for the following carriages.

SUMMARY

In one example, a repeater system includes a first master unit, a second master unit, and remote units. The first master unit is positionable at a first location on a movable object. The second master unit is positionable at a second location on the movable object. The first master unit and the second master unit are configured to communicatively couple to antennas for receiving, in a downlink direction, a downlink RF signal from at least one base station external to the movable object and for transmitting, in an uplink direction, an uplink RF signal towards the at least one base station. The remote units are configured to couple through a transport medium to the first master unit by a first connection and to the second master unit by a second connection. The remote units are positionable on the movable object and associated with different coverage areas within the movable object. The remote units are configured to couple to antenna systems for transmitting, in the downlink direction, the downlink RF signal into associated coverage areas of the movable object and for receiving, in the uplink direction, the uplink RF signal from the coverage areas. For at least a subgroup of the remote units, a first gain for the first connection and a second gain for the second connection are controllable by a control unit.

In another example, a method is provided that includes:
receiving, by a first master unit at a first location on a movable object and a second master unit located at a second location on the movable object, a downlink RF signal in a downlink direction from at least one base station that is located outside of the movable object;
transmitting, by remote units associated with different coverage areas within the movable object and connected to the first master unit and the second master unit via a transport medium, the downlink RF signal in the downlink direction into an associated coverage area of the movable object;
receiving, by the remote units, an uplink RF signal in an uplink direction from a coverage area;
transmitting, by the first master unit and the second master unit, the uplink RF signal in the uplink direction towards the at least one base station; and controlling, for at least a subgroup of the remote units by a control unit, a first gain for a connection with the first master unit and a second gain for the connection with the second master unit.

BRIEF DESCRIPTION OF DRAWINGS

FIG. 3 shows a diagram of a reference signal receive power (RSRP) of two base stations in a handover scenario according to some aspects.

FIG. 4 shows a schematic view of a setup of different independent repeater systems on different carriages of a train according to some aspects.

FIG. 6 shows a flow chart of a method for controlling gain settings of the repeater system of FIG. 5 according to some aspects.

DETAILED DESCRIPTION

Figure 1:
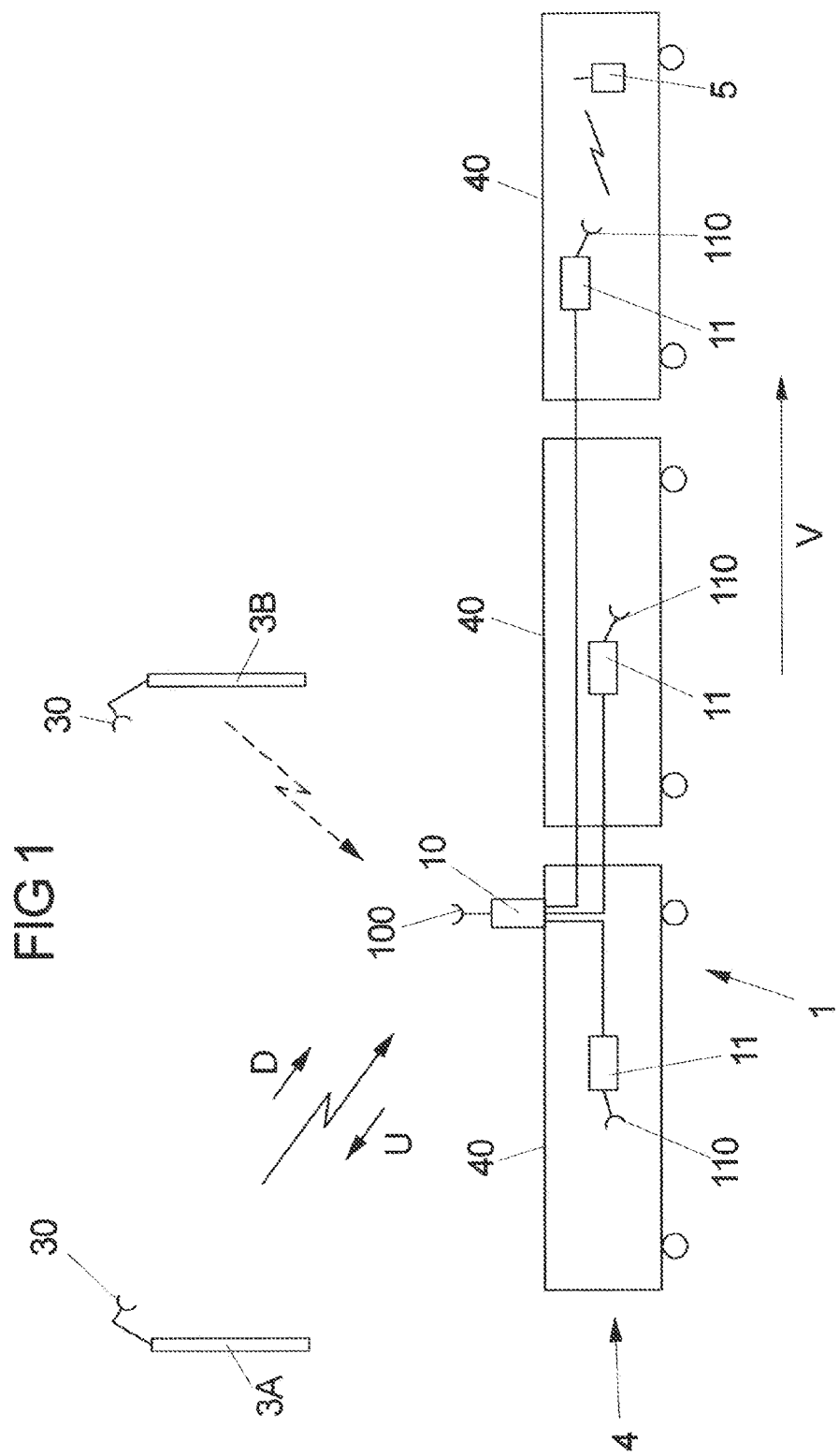
FIG. 1 shows a schematic overview of a repeater system on a train, which includes a master unit connected to multiple remote units according to some aspects.

Certain aspects and features relate to a repeater system that can influence the timing of handovers of mobile devices communicating via the repeater system.

In some aspects, a repeater system for use on a movable object, for example a train, includes a first master unit to be located at a first location on the movable object and a second master unit to be located at a second location on the movable object. The first master unit and the second master unit are each connected to an antenna for receiving, in a downlink direction, a downlink RF signal from at least one base station outside of the movable object and for transmitting, in an uplink direction, an uplink RF signal towards the at least one base station.

Multiple remote units can be associated with different coverage areas within the movable object and can be connected to the first master unit and the second master unit via a transport medium. The remote units can each be connected to an antenna system for transmitting, in the downlink direction, the downlink RF signal into the associated coverage area of the movable object and for receiving, in the uplink direction, the uplink RF signal from the coverage area.

A control unit is configured to control, for at least a subgroup of the remote units, a first gain for the connection with the first master unit and a second gain for the connection with the second master unit.

The repeater system may be used on a train. For example, the first master unit may be located at the front of the train, such as on a front carriage of the train. The second master unit may be installed on the rear of the train, such as on a rear carriage of the train (referring to the direction of travel of the train).

In some examples, the first master unit and the second master unit are provided on the movable object—the train in this example. The master units can provide a connection with one or more outside base stations and for receiving RF signals from the outside base stations and transmitting RF signal towards the outside base stations. On the movable object, for example in carriages of a train, multiple remote units are installed. Each remote unit can be communicatively coupled to both the first master unit and the second master unit via a transport medium, for example an air interface, an optical fiber connection, one or more coaxial cables, or the like. The coupling may be a bus connection, for example a ring bus connection or the like.

Coupling of each remote unit with the two master units can be controlled by a control unit. The control unit can be configured to control a gain of the coupling with the first master unit and the second master unit. Each remote unit can receive signals from the two master units in a weighted fashion, with the gain setting constituting weighting factors.

By gain setting of the couplings with the first master unit and with the second master unit, the control unit may prioritize whether a mobile device in the range of a particular remote unit communicates with an outside base station via the first master unit, via the second master unit, or via both master units.

This set-up may be useful to control handovers of mobile devices (generally denoted as user equipment or "UE") located within the different coverage areas of the movable object, for example located in different carriages of a train. By setting the gain, a mobile device in the range of the remote unit can communicate with an outside base station via the first master unit, the second master unit or both, and the mobile device may trigger a handover in certain circumstances. For example, a handover may be triggered when the first master unit enters into a handover region in between two base stations (if the mobile device communicates via the first master unit). A handover may be triggered when the second master unit enters into a handover region between two base stations (if the mobile device communicates via the second master unit). A handover may be triggered if the first master unit is in the range of a first base station and the second master unit is in the range of a second base station and if a handover criteria is fulfilled—for example if a signal received from the first base station drops below a certain level and a signal received from the second base station rises above a certain level (in this case the mobile device communicates via both master units, where the connections with the master units are weighted by the gain setting of each connection and the timing of the handover may be influenced by the gain setting).

By controlling the gain setting of the connections of the remote units with the master units, a handover criteria can be fulfilled at different times or mobile devices communicating with different remote units within the movable object, for example within a train, such that the mobile devices can enter into a handover procedure in a time-offset manner. Mobile devices on a movable object may not all at the same time start a handover procedure, but the mobile devices can initiate a handover in a time-offset manner, thus reducing the handover outage probability.

This can be achieved with limited equipment, at least compared to a setup in which a separate repeater system is used on each carriage. Namely, only two master units need to be installed on a movable object, where the two master units are installed at displaced locations, for example at the very front and at the very rear of a train. Each master unit can be connected to all remote units, where the gain of the connections can be set by the control unit.

The control unit may be configured to increase or decrease the first gain for the connection with the first master unit or the second gain for the connection with the second master unit. The control unit may be configured to dynamically change the gain settings for the different connections with the different remote units, depending for example on changing environmental conditions.

In some examples, the control unit may be configured to increase the first gain upon decreasing the second gain and to decrease the first gain upon increasing the second gain. The adjustment of the first gain of the connection of a remote unit with the first master unit and of the second gain of the connection of a remote unit with the second master unit can occur in a concerted fashion such that the first gain is increased when the second gain is decreased and vice versa. By adjusting the gains in this way, the connections can be prioritized such that a mobile device connected with a remote unit, according to its gain settings, predominantly exchanges signals via the first master unit or the second master unit.

The first gain and the second gain may be individually adjustable for each remote unit. For each remote unit a different gain setting for the two connections (with the first master unit on the one hand and the second master unit on the other hand) may apply.

To control a handover of mobile devices in coverage areas of different remote units, the gain settings of the different remote units can be dynamically adjusted in a concerted fashion. Namely, the first gain and the second gain of remote units associated with neighbouring coverage areas, for example of neighbouring carriages of a train, can be adjusted consecutively, i.e., one after the other, such that one remote unit after the other may be switched from one master unit to the other master unit to force a handover of mobile devices connected with the remote units.

The control unit may be configured to control the first gain and the second gain of a remote unit to force a handover of a mobile device connected with the remote unit (e.g., operating in the coverage area associated with the particular remote unit). The mobile device may be forced to handover from a first base station spanning a first communication cell to a second base station spanning a second communication cell, where at least one of the first master unit and the second master unit is located in the range of each communication cell. For example, if the first master unit is located in the cell of the second base station and the second master unit is located in the cell of the first base station (as the train moves), by adjusting the gain of the connections of the remote unit such that the mobile device connected with the remote unit is forced to communicate via the first master unit, the mobile device is forced to handover from the first base station to the second base station in order to keep up the connection. Although the actual handover procedure can be fully carried out between the mobile device and the base stations that the mobile device is communicating with (via the repeater system), the timing of the handover can be forced by the settings of the repeater system.

Controlling of the repeater system may occur in different ways and based on different criteria. For example, the control unit may be configured to control the first gain and the second gain depending on a signal strength measurement of a signal received from a base station. By measuring the received signal strength of a reference signal obtained from base stations outside of the movable object, it can be determined if the first master unit or the second master unit are in the range of one or multiple base stations and whether a handover may be indicated for mobile devices within the movable object. Alternatively, controlling may also occur based on location information received from a positioning system, such as a GPS system, making use of a prior knowledge where cells of base stations are located. If the location information indicates that a (known) cell of a base station has been entered, controlling the gains of the connections of the remote units may be adjusted accordingly in order to force a handover of mobile devices connected with the remote units.

FIG. 1 shows, in a schematic drawing, a repeater system 1 that is a distributed antenna system (DAS) including a master unit 10 and multiple remote units 11. The master unit 10 may, for example, be located at a central location on a train 4 and may include an antenna 100 by which the master unit 10 wirelessly connects to one or more base stations 3A-3B of one or more communication networks using an air interface. The remote units 11 are located within different carriages 40 of the train 4 and serve to provide coverage throughout the different carriages 40 of the train 4.

The remote units 11 are connected to the master unit 10 via a transport medium 12, for example a network of optical fibers, and can be in communication connection with the master unit 10. Each remote unit 11 includes an antenna 110 by which the remote unit 11 can connect to a mobile device 5 of a user in a carriage 40 of the train 4.

In a downlink direction D, an RF input signal $RF_{IN}$ can be received via the antenna 100 at the master unit 10, processed within the master unit 10 for transporting it via the transport medium 12 to the different remote units 11 and, after further processing, transmitted via the antennas 110 as an RF output signal $RF_{OUT}$. The RF output signal $RF_{OUT}$ may be received by a mobile device 5 in a carriage 40 of the train 4.

Vice versa, in an uplink direction U an RF signal received at the antenna 110 of a remote unit 11 can be provided via the transport medium 12 to the master unit 10 and retransmitted via the antenna 100 towards an antenna 30 of a base station 3A of an outside communication network.

Figure 2:
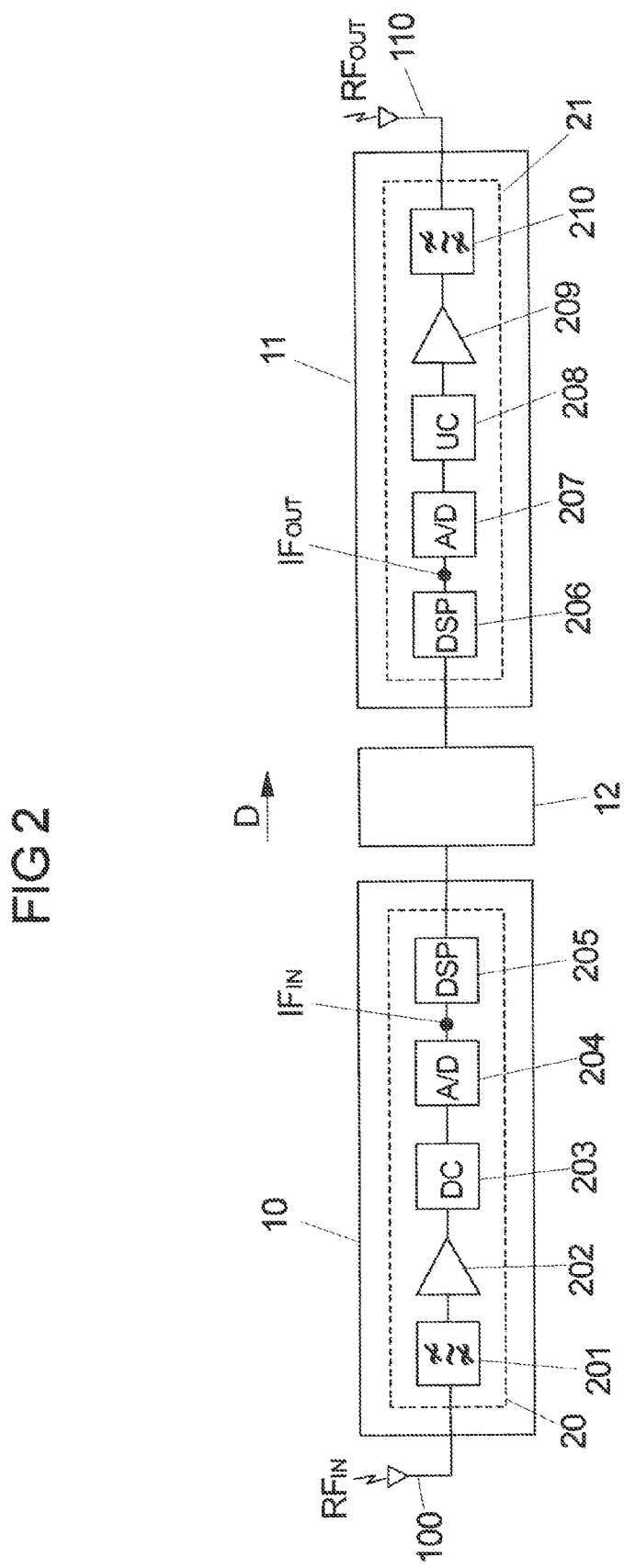
FIG. 2 shows a schematic drawing of functional processing blocks in the master unit and a remote unit for digital processing of an RF signal in a downlink direction according to some aspects.

The repeater system 1 may perform digital processing of the RF signal, as functionally shown in FIG. 2. FIG. 2 depicts such functional entities of the master unit 10 and a remote unit 11 connected via the transport medium 12 to the master unit 10 that are used in the downlink direction D for processing the RF input signal $RF_{IN}$ for retransmission.

In the embodiment of FIG. 2, the master unit 10 includes a receiving section 20 for processing an RF input signal $RF_{IN}$ received by the antenna 100. In particular, the receiving section 20 includes an RF filter 201 in the shape of a bandpass filter for filtering out a frequency band to be processed and transported for retransmission. From the RF filter 201, the RF input signal $RF_{IN}$ is fed to a low noise amplifier 202 and to a downconverter 203 for downconverting the RF signal into an intermediate frequency band. After that, the signal is fed to an analog-to-digital converter 204 for digitizing the RF signal, such that an (intermediate-frequency) digital signal $IF_{IN}$ is obtained.

Alternatively, the RF signal may instead be downconverted into a baseband IQ signal (Zero IF).

The digital signal $IF_{IN}$ is fed to a digital signal processing unit (DSP, FPGA, ASIC or the like) 205 and is digitally processed in the digital signal processing unit 205.

After digital signal processing, the processed signal is, via the transport medium 12, transported to a digital signal processing unit 206 of a transmitting section 21 of a remote unit 11, in which the signal is further processed such that a digital signal $IF_{OUT}$ in the intermediate frequency range is obtained. This digital signal $IF_{OUT}$ is converted to an analog RF signal by a digital-to-analog converter 207, upconverted by an upconverter 208, power-amplified by a power amplifier 209, filtered by an RF filter 210 in the shape of a bandpass filter, and transmitted as an RF output signal $RF_{OUT}$ via the antenna 110 of the remote unit 11.

Instead of a single digital-to-analog converter, alternatively two digital-to-analog converters for the I/Q signal paths and an upconversion using a modulator may be used.

In the uplink direction U, essentially the same processing occurs, where an RF input signal is received and processed by a receiving section 20 of a remote unit 11 and is further processed and transmitted via a transmitting section 21 of the master unit 10.

Digital filtering can occur within the digital signal processing units 205, 206. Within the digital signal processing units 205, 206, subbands contained in the frequency band processed by the repeater system 1 may be isolated from each other and may be processed separately by digital filters. Each digital filter can include a passband associated with a carrier of a communication channel of a communication network, where the digital filters may be programmable in bandwidth, center frequency, and passband characteristics.

As indicated in FIG. 1, the train 4 moves forward in a direction of travel V. This can cause the location of the master unit 10 with its antenna 100 to change with regard to the base station 3A to which it is currently connected (e.g., mobile devices 5 within the train 4 communicate via the master unit 10 with the base station 3A). As the antenna 100 moves out of a cell spanned by the base station 3A and enters into a cell spanned by another base station 3B, the mobile devices 5 communicating via the master unit 10 may trigger a handover causing a communication connection to be handed over from the (former) base station 3A to the (new) base station 3B. This can occur, as illustrated in FIG. 3, if, for example for an LTE connection, the reference signal receive power (RSRP) of the form a base station 3A decreases and the reference signal receive power of the new base station 3B increases such that a difference between the two exceeds a given threshold. Once the difference exceeds the threshold, the handover is triggered and the communication connection is switched over from the former base station 3A to the new base station 3B.

Although a handover scenario is illustrated in FIG. 3 according to an LTE connection characterized by its reference signal receive power (RSRP), this is not to be understood as limiting. In principle, the same applies for connections of other radio access technologies (e.g., GSM, UMTS, or the like), where different measures may be taken to determine the strength or quality of a received signal.

As in the setup of FIG. 1, communication connections of the mobile devices 5 located within the train 4 can be routed via the same master unit 10 and its antenna 100. Handovers of the mobile devices 5 and their communication connections can occur at substantially the same time, leading to an increased handover outage probability. As a consequence, calls may be dropped and data connections may be interrupted. If, for example, hundreds of passengers are riding on a train 4, this may be a problem.

FIG. 4 illustrates one example of a solution. In this setup, different repeater systems having different master units with different antennas 100 are installed on the different carriages 40 of a train 4. In this case, the antenna 100 can enter into a handover area in between the cells CA, CB of the different base stations 3A, 3B at different times, such that the handovers are split by carriage and do not all occur at the same time. This may involve increased costs, due to the need to install different repeater systems on the different carriages. Further, if a handover of users in a carriage 40 fails, there may be interference with handovers of users in a subsequent carriage if the mobile devices 5 try to reconnect with the former base station 3A.

Figure 5:
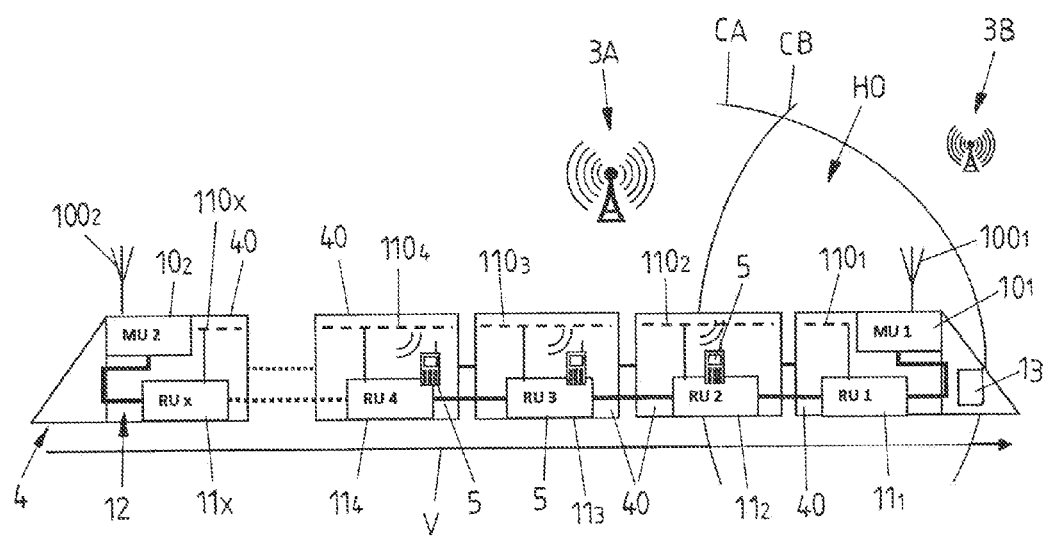
FIG. 5 shows a schematic view of a setup of a repeater system on a train, which includes two master units and multiple remote units according to some aspects.

FIG. 5 depicts a setup that can overcome at least some of these issues. In this setup, two master units $10_1$, $10_2$ are installed on the train 4: a first master unit $10_1$ is installed on a first carriage 40 and a second master unit $10_2$ is installed on a rear carriage 40 of the train 4 (referring to the direction of travel V). Each master unit $10_1$, $10_2$ can be directly connected to an antenna $100_1$, $100_2$ (for example by a coaxial cable) via which it may exchange signals with base stations 3A, 3B outside of the train 4. In addition, each master unit $10_1$, $10_2$ can be connected to multiple remote units $11_1$-$11_X$. At least one remote unit $11_1$-$11_X$ can be installed on each carriage 40.

Each of the remote units $11_1$-$11_X$ is connected to both master units $10_1$, $10_2$ via a transport medium 12, for example a ring bus connection or the like. In addition, each of the remote units $11_1$-$11_X$ is connected to an antenna system $110_1$-$110_X$ for transmitting RF signals into the associated carriage 40 and to receive RF signals out of the carriage 40. The antenna system $110_1$-$110_X$ may be a leaky feeder or another suitable antenna for providing coverage within a carriage 40.

A mobile device 5 within a carriage 40 can communicate via the remote unit $11_1$-$11_X$ of the associated carriage 40 and one or both master units $10_1$, $10_2$ with an outside base station 3A. The connection with the first master unit $10_1$ may have a first gain and the connection with the second master unit $10_2$ may have a second gain. The gain settings can be controlled via a control unit 13 that may be a separate unit located somewhere on the train 4 or that may be integrated into one of the master units $10_1$, $10_2$.

By the gain settings it can be prioritized via which master unit $10_1$, $10_2$ a mobile device 5 within a particular carriage 40 communicates with an outside base station 3A, 3B. This may in particular be used to control a handover of mobile devices 5 within the different carriages 40 of the train 4.

For example, when looking at the second remote unit $11_2$, by suitably adjusting the gain setting of the connection of the remote unit $11_2$ with the first master unit $10_1$ and the gain setting of the connection with the second master unit $10_2$, a mobile device 5 within the carriage 40 associated with the second remote unit $11_2$ can be forced to handover from the former base station 3A to the new base station 3B. By increasing the gain of the connection between the remote unit $11_2$ and the first master unit $10_1$ and by at the same time decreasing the gain of the connection between the remote unit $11_2$ and the second master unit $10_2$, the signals adopted by the antenna $100_1$ of the first master unit $10_1$ can be prioritized. Because the antenna $100_1$ of the first master unit $10_1$ is already in the handover area HO and in the range of the new base station 3B, the mobile devices 5 within the coverage area of the remote unit $11_2$ can be forced to handover to the new base station 3B.

The same may occur for the next, consecutive remote unit $11_3$ with an appropriate time offset, such that the mobile devices 5 in the coverage area of the next remote unit $11_3$ perform their handover in a time-offset manner with respect to the mobile devices 5 in a carriage 40 associated with the previous remote unit $11_2$.

By applying the individual gain adjustment in a consecutive manner, the whole handover scenario of the train 4 can be controlled such that the handovers of the mobile devices 5 within the train 4 do not occur at the same time, but in a time offset manner. By dynamically adjusting the gain settings of the connections of the remote units $11_1$-$11_X$, the handover scenarios can be flexibly influenced to force the mobile devices 5 to perform their handovers at suitable times in a staggered manner.

Controlling the gain setting by the control unit 13 may depend on a reference signal power level measured at the first master unit 10$_1$ and the second master unit 10$_2$. Alternatively, location information, for example obtained via a GPS system, may be used, making use of the knowledge that at a certain location the cell of a certain base station 3A, 3B is entered or left.

A flow chart of an example of a process for controlling the gain settings of the connections of the remote units 11$_1$-11$_X$ is illustrated in FIG. 6. In block S1 it is checked whether a handover area HO is approached. If this is not the case, normal operation is continued, while also continuing checking whether a handover area is approached in block S2.

If it is found that a handover area HO is approached in block S1, for example by measuring a reference signal power level at the master units 10$_1$, 10$_2$, in block S3 the gain between the first master unit 10$_1$ and the remote units 11$_1$-11$_X$ may be reduced to avoid a premature handover of the mobile devices 5 on the train 4.

In block S4 it is checked whether a handover condition is fulfilled at the first master unit 10$_1$. If this is the case, it is moved to block S5. If this is not the case, block S4 is repeated.

If the handover condition is fulfilled at the master unit 10$_1$, first the gain of the connection between the first master unit 10$_1$ and the first remote unit 11$_1$ can be increased and, at the same time, the gain between the second master unit 10$_2$ and the first remote unit 11$_1$ can be decreased. It can be checked whether for the mobile devices 5 connected to the first remote unit 11$_1$ the handover procedures have been successful. If not, it is waited for a guard period and then checked again in block S7. If the handover procedures have been successful, the gain between the first master unit 10$_1$ and the second remote unit 11$_2$ is increased and at the same time the gain between the second master unit 10$_2$ and the second remote unit 11$_2$ is decreased to force the mobile devices 5 associated with the second remote unit 11$_2$ into a handover. It then is checked whether the handovers for the mobile devices 5 associated with the second remote unit 11$_2$ have been successful in block S9.

The blocks can be repeated for further remote units 11$_3$-11$_X$ until the handovers for the mobile devices 5 associated with the remote units 11$_1$-11$_X$ occur, in blocks S11, S12, S13.

In some examples, it can be possible to split the number of mobile devices starting a handover scenario into several smaller handovers (e.g., decrease the handover outage probability). The handover cycle of the individual carriages can be artificially stretched in case of a handover outage of one of the other carriages. A handover area can be shifted (e.g., by moving the handover area to regions with low driving speed to increase the handover success probability). The handover process of the whole train can be linked to GPS data available in the DAS (e.g., once the trains front antenna enters a specific GPS location, the handover scenario will be started). The handover process can be triggered by measuring the reference signal power level at the first master unit and the second master unit. In other examples, additional features can be realized by the end user.

In some examples, assuming the train is moving in an area where no handover is to be performed, the two roof antennas may be used for 2×2 MIMO (Multiple Input Multiple Output) transmissions. For example, the antenna network inside the train can be doubled. Once a handover is expected, the MIMO operation can be switched to common SISO (Single Input Single Output) operation to control the handover in the same way as discussed above.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A repeater system comprising:
   a first master unit positionable at a first location on a movable object and a second master unit positionable at a second location on the movable object, the first master unit and the second master unit being configured to communicatively couple to antennas for receiving a downlink RF signal from at least one base station external to the movable object and for transmitting an uplink RF signal towards the at least one base station; and
   remote units configured to couple through a transport medium to the first master unit by a first connection and to the second master unit by a second connection, the remote units being positionable on the movable object and associated with different coverage areas within the movable object, the remote units being configured to couple to antenna systems for transmitting the downlink RF signal into associated coverage areas of the movable object and for receiving the uplink RF signal from the coverage areas,
   wherein, for at least a subgroup of the remote units, a first gain for the first connection and a second gain for the second connection are controllable by a control unit.

2. The repeater system according to claim 1, further comprising the control unit configured to increase or decrease the first gain for the first connection with the first master unit and the second gain for the second connection with the second master unit.

3. The repeater system according to claim 2, wherein the control unit is configured to increase the first gain based on decreasing the second gain and to decrease the first gain based on increasing the second gain.

4. The repeater system according to claim 2, wherein the control unit is configured to adjust the first gain and the second gain for different remote units such that the first gain and the second gain of the remote units associated with neighbouring coverage areas are adjusted consecutively.

5. The repeater system according to claim 2, wherein the control unit is configured to control the first gain or the second gain for a particular remote unit to trigger a handover of a mobile device operating in a coverage area associated with the particular remote unit, from a first base station spanning a first communication cell to a second base station spanning a second communication cell, wherein at least one of the first master unit or the second master unit is located in the range of each communication cell.

6. The repeater system according to claim 2, wherein the control unit is configured to control the first gain and the second gain based on a signal strength measurement of a signal received from a base station or location information received from a positioning system.

7. The repeater system according to claim 1, wherein the first gain and the second gain are individually adjustable for each of the remote units.

8. The repeater system according to claim 1, wherein the movable object is a train.

9. The repeater system according to claim 8, wherein the first master unit is positionable proximate to a first end of the train and the second master unit is positionable proximate to a second end of the train that is an opposite end to the first end.

10. The repeater system of claim 9, wherein the train comprises a plurality of train cars, wherein the remote units are positionable in the plurality of train cars such that each train car includes a remote unit.

11. A method comprising:
receiving, by a first master unit at a first location on a movable object and a second master unit located at a second location on the movable object, a downlink RF signal from at least one base station that is located outside of the movable object;
transmitting, by remote units associated with different coverage areas within the movable object and connected to the first master unit and the second master unit via a transport medium, the downlink RF signal into an associated coverage area of the movable object;
receiving, by the remote units, an uplink RF signal from a coverage area;
transmitting, by the first master unit and the second master unit, the uplink RF signal towards the at least one base station; and
controlling, for at least a subgroup of the remote units by a control unit, a first gain for a connection with the first master unit and a second gain for the connection with the second master unit.

12. The method according to claim 11, further comprising:
increasing the first gain in response to decreasing the second gain.

13. The method according to claim 11, decreasing the first gain in response to increasing the second gain.

14. The method according to claim 11, wherein controlling the first gain and the second gain includes adjusting the first gain and the second gain for different remote units such that the first gain and the second gain of the remote units associated with neighbouring coverage areas are adjusted consecutively.

15. The method according to claim 11, wherein controlling the first gain and the second gain includes controlling the first gain or the second gain for a particular remote unit to trigger a handover of a mobile device operating in the coverage area associated with the particular remote unit, from a first base station spanning a first communication cell to a second base station spanning a second communication cell, wherein at least one of the first master unit or the second master unit is located in the range of each communication cell.

16. The method according to claim 11, wherein controlling the first gain and the second gain includes controlling the first gain and the second gain based on a signal strength measurement of a signal received from a base station or location information received from a positioning system.

17. The method according to claim 11, wherein controlling the first gain and the second gain includes individually adjusting the first gain and the second gain for each of the remote units.

18. The method according to claim 11, wherein the movable object is a train.

19. The method according to claim 18, wherein the first master unit is proximate to a first end of the train and the second master unit is proximate to a second end of the train that is an opposite end to the first end.

20. The method of claim 19, wherein the train comprises a plurality of train cars, wherein the remote units are in the plurality of train cars such that each train car includes a remote unit.

* * * * *